(12) United States Patent
Gurr

(10) Patent No.: US 8,607,509 B2
(45) Date of Patent: Dec. 17, 2013

(54) ROOF ICE AND SNOW MELT SYSTEM

(75) Inventor: Michael J. Gurr, South Jordan, UT (US)

(73) Assignee: Engineered Roof De-Icing Inc.

(*) Notice: Subject to any disclaimer, the term of this patent is extended or adjusted under 35 U.S.C. 154(b) by 2128 days.

(21) Appl. No.: 11/122,451

(22) Filed: May 5, 2005

(65) Prior Publication Data

US 2006/0288652 A1 Dec. 28, 2006

(51) Int. Cl.
  *E04D 13/18* (2006.01)
(52) U.S. Cl.
  USPC ......................................... 52/173.3
(58) Field of Classification Search
  USPC ......... 52/519, 533, 539, 173.3; 219/213, 212; 126/622; 392/436, 437
  See application file for complete search history.

(56) References Cited

U.S. PATENT DOCUMENTS

| | | | | |
|---|---|---|---|---|
| 3,691,343 A * | 9/1972 | Norman | ......................... | 219/213 |
| 4,081,657 A * | 3/1978 | Stanford | ....................... | 219/213 |
| 4,258,703 A * | 3/1981 | Reitmaier | ..................... | 126/623 |
| 4,769,526 A * | 9/1988 | Taouil | ........................... | 219/213 |
| 5,074,093 A * | 12/1991 | Meadows | ........................ | 52/537 |
| 5,391,858 A * | 2/1995 | Tourangeau et al. | ......... | 219/213 |
| 5,509,246 A * | 4/1996 | Roddy | ............................ | 52/533 |
| 5,729,947 A * | 3/1998 | Dawes | ............................ | 52/521 |
| 5,786,563 A * | 7/1998 | Tiburzi | ........................ | 219/213 |
| 6,759,630 B1 * | 7/2004 | Tenute | .......................... | 219/213 |
| 2003/0213796 A1 * | 11/2003 | Heise | ............................ | 219/535 |

* cited by examiner

Primary Examiner — Christine T Cajilig
(74) Attorney, Agent, or Firm — Kirton|McConkie

(57) ABSTRACT

A snow and ice melting device adapted to rest on a roof; having a flat plate with a series of channels therethrough containing a heating element to heat the flat plate and melt the ice and snow on the roof.

5 Claims, 12 Drawing Sheets

ROOF ICE AND SNOW MELT SYSTEM

BACKGROUND OF THE INVENTION

Figure 1:
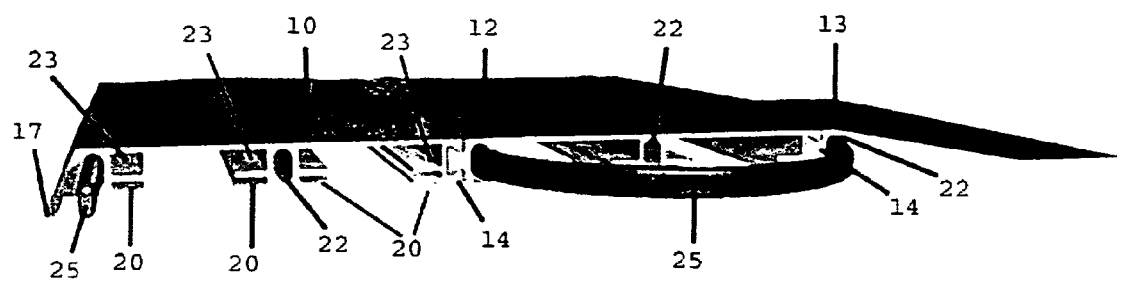

This invention relates to a device for melting ice and snow along the edge of roofs. Ice dams and icicles forming on building roofs near the outer edges, (eaves) or where two pitched surfaces of a roof meet, (valleys) and extending into the roof gutters are a significant source of damage to a building. These ice dams and icicles also create safety hazards. Ice dams form when snow on an inner or middle section of a roof melts and the melt water flows down to the outer section of the roof, where it then refreezes into ice. The heat formed within the building conducts through the roof to melt the snow on the middle portion of the roof. However, the outer edge of the roof extends outwardly beyond the outside wall of the building, and therefore is not heated by the heat formed within the building. Thus, the melted snow from the middle portion of the roof refreezes and accumulates on the outer edge portion of the roof and in the gutters, thereby forming ice dams.

These ice dams are known to cause leaks in roofs by allowing water to enter underneath the shingles of the roof and expand upon refreezing. This process forces the shingle away from the other shingles on the roof. The weight of ice dams and icicles can also tear a gutter, facia and soffit away from the building, causing costly repairs and/or a dangerous hazard.

SUMMARY OF THE INVENTION

By providing a source of radiant heat around areas on roofs where snow and ice could potentially accumulate and form into ice dams and/or icicles, the invention eliminates the buildup and formation of snow and ice, thereby eliminating the potential problems associated with such.

The invention also prevents massive buildup of ice and snow in gutters because of its proximity to the roof edge "eave" where gutters mount to a building, allowing heated melt water and ambient surrounding temperature to prevent such buildup. The invention also provides for an extended heat source into the gutters and downspouts themselves.

The invention's panels are designed to slope with the roof's pitch and have a smooth surface to help achieve snow and ice buildup prevention by allowing melting snow, water and ice to run off of them.

With panels that can be cut to length, or cut to accommodate roof angles, the invention can be fully customized to accommodate any building structure's roof. The invention can be retro-fitted onto an existing structure or provided for on a new construction. The invention allows for the customizing of desired exposed heated area by integrating a slide-together dove tail or similar connection horizontally between a plurality of panels, providing for the unlimited 'stacking' of extension panels to achieve desired exposure.

The invention can incorporate automated controls, namely thermostats that can sense ambient temperatures, or temperature and moisture conditions. With these controls, the invention can be fully automatic and more energy efficient. The invention can utilize existing or dedicated electrical circuitry or boiler/radiant heat resources in the building.

The most common standard for the attempted prevention of damage caused by ice dams had been a heating cable mounted to roof eaves and valleys in a 'zig-zag' pattern, theoretically providing pathways for melt water to flow past ice dams. This is not an effective way to eliminate ice dams or their formation, only a way to channel water between sections of ice. Under conditions where small amounts of snow, ice and freezing ambient temperatures exist, 'zig-zag' can be somewhat effective; however, under many of these conditions, it has little effect on solving the problems. Relative to the invention, 'zig-zag' heat cable is not energy efficient. Self regulating heating cables are designed to draw more or less wattage based on the ambient temperature surrounding the cable. When exposed to the surrounding air, the self regulating heat cable mounted exposed on a roof will draw more power to run as opposed to a heat cable or heat source mounted in a panel system designed to retain heat. Unlike an exposed 'zig-zag' cable system, the present system is designed to eliminate ice and snow buildup along the entire roof eave and/or valley where mounted. Similar but less effective and efficient products are available and/or patented. Some products intended for the prevention of ice dams and the problems associated with them, include a heated element that transfers heat through air space and then to a thin, exposed cover. Others incorporate a heated element mounted under roofing material, forcing the produced heat to transfer through such roofing materials. These methods are not very effective and efficient for the same reasons stated above. The present system heats the exposed element itself, and therefore is much more effective and efficient for the elimination and prevention of ice dams, snow buildup, icicles and all of the problems associated therewith.

The system is also designed to be a decorative and attractive addition to the building's roof structure. The aesthetically pleasing look and the many available colors of the present system not only provides functionality, but also looks attractive, thereby allowing for year round deployment. Some other products that attempt the same functionality look obtrusive and unattractive.

THE DRAWINGS

Figure 2:
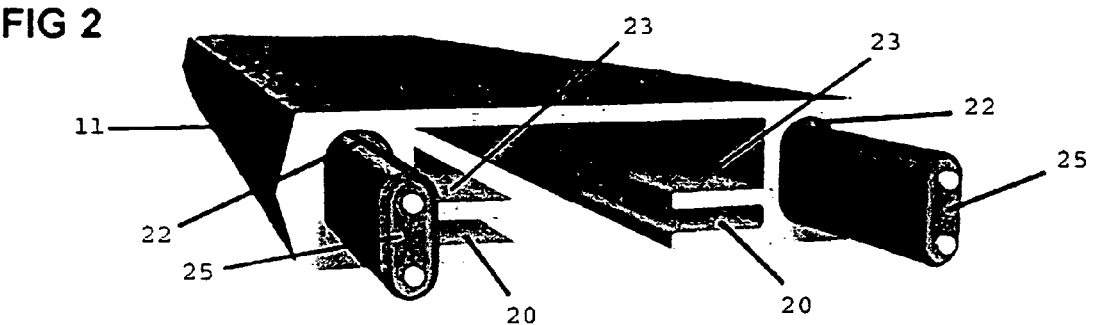
Figure 3:
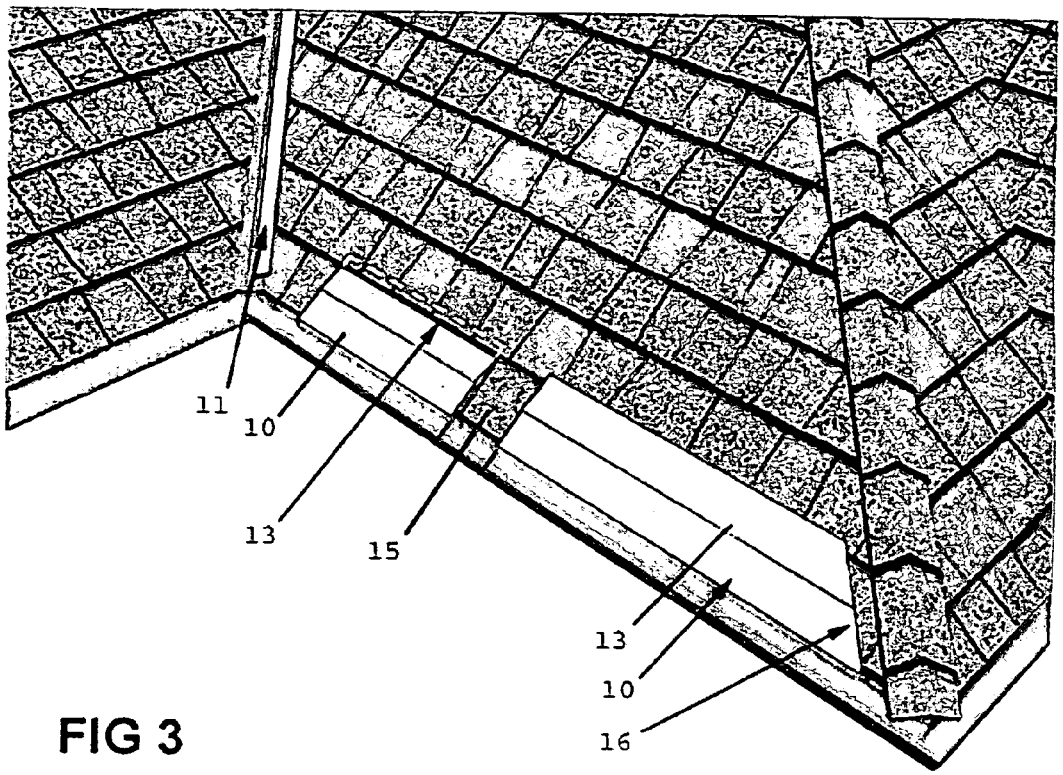
Figure 4:
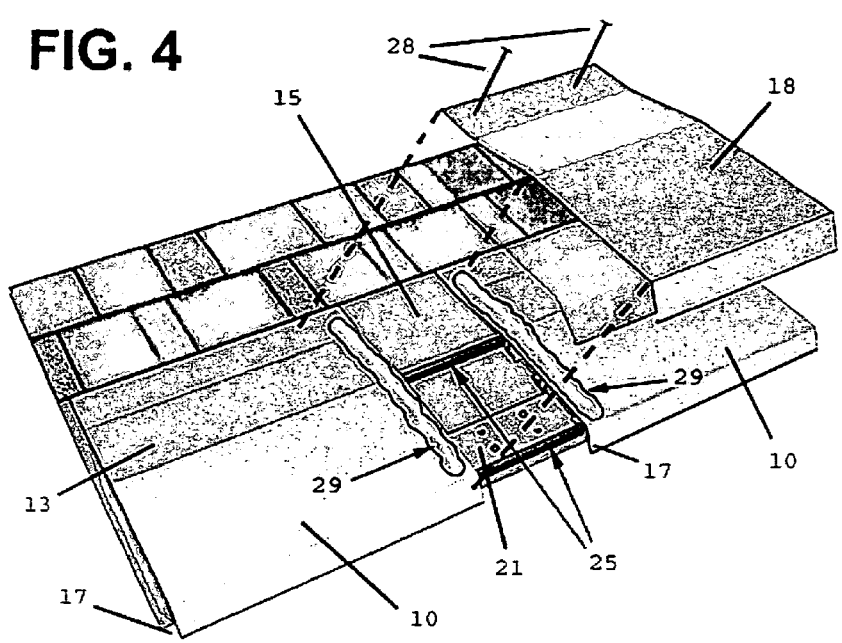
Figure 5:
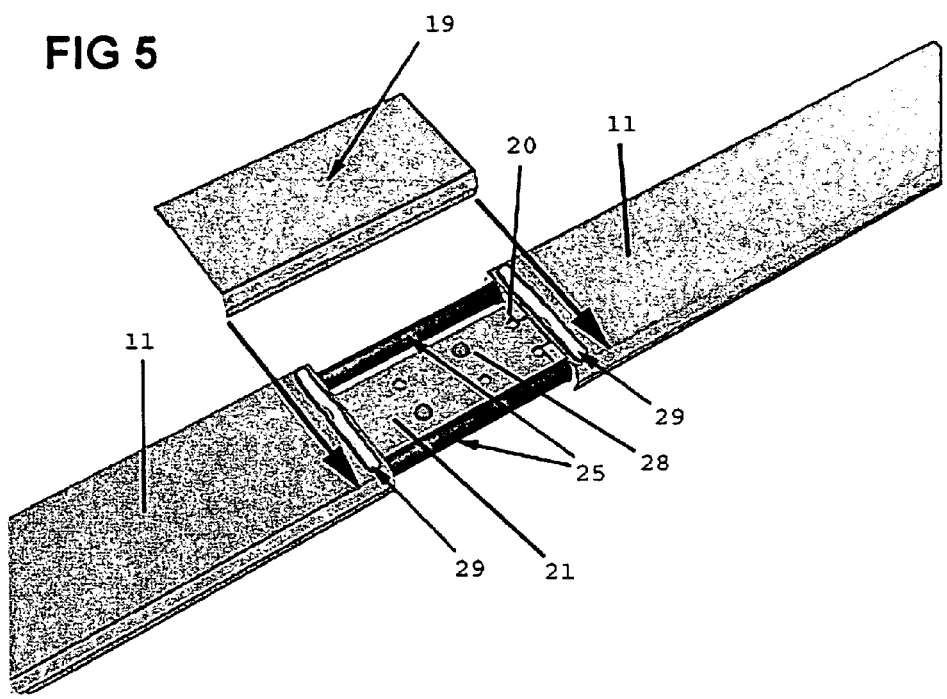
Figure 6:
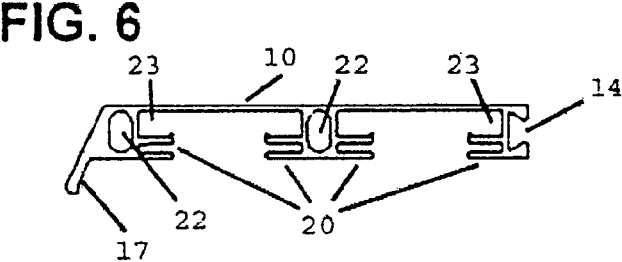
Figure 7:
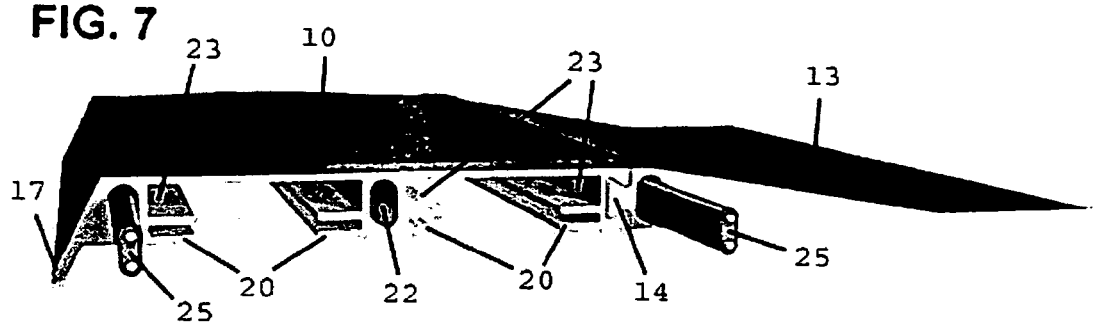
Figure 8:
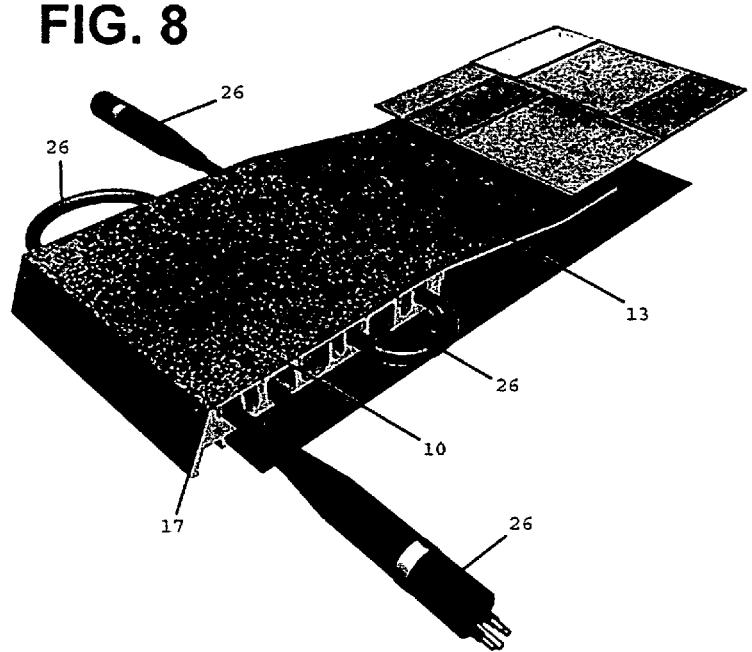
Figure 9:
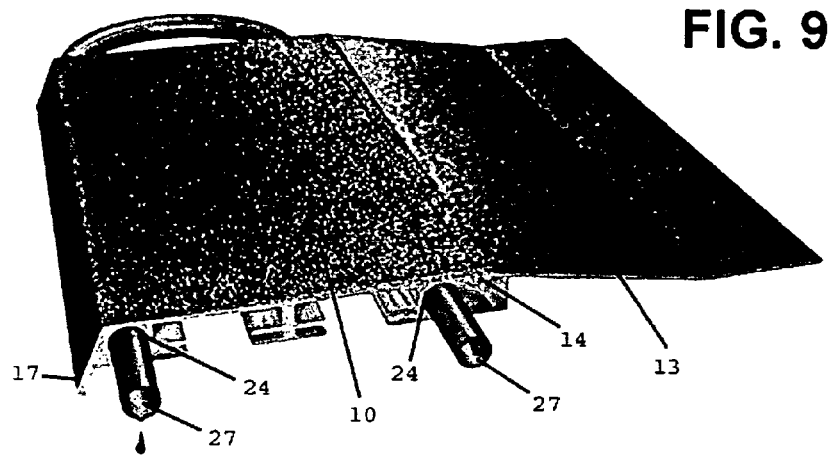
Figure 10:
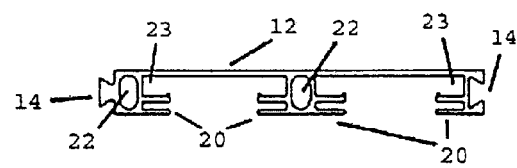
Figure 11:
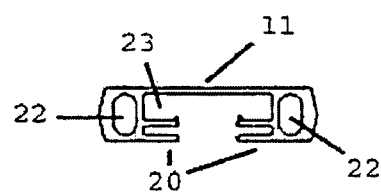
Figure 12:

A preferred embodiment of the invention is illustrated in the accompanying drawings in which:

FIG. 1, is a perspective view;
FIG. 2, is a sectional view;
FIG. 3, is a perspective view;
FIG. 4, is a sectional view;
FIG. 5, is a sectional view;
FIG. 6, is a view showing different arrangements of heat cable apertures;
FIG. 7, is a sectional view;
FIG. 8, is a perspective view; and
FIG. 9, is a partial view.
FIG. 10 is a depiction of a panel with a different arrangement of heat cable apertures.
FIG. 11 is a depiction of a panel with a different arrangement of heat cable apertures.
FIG. 12 is a depiction of a panel with a different arrangement of heat cable apertures.

DETAILED DESCRIPTION OF THE INVENTION

The present system utilizes 4 panel types. All panels are made from extruded aluminum alloy. These 4 different panel types are each preferably 6' long to begin with, but can be cut to length to customize the system.

Eave panel (10): Designed to mount to the roof eave parallel with the roofline, the eave (10) incorporates a front 'lip' (17) to hang over edge of roofing material and drip edge. Encapsulated within the panel are channels (22) that run the length of the panel to accommodate the heat source (25) (27). The underside of the panel has a separate channel (23) that is open on one side to allow for a pre-terminated heat cable (26) to be pushed into place.

Also running the length of the panel (10) is an integrated mounting bracket slot (20) that accepts a slide in bracket (21) to attach panels onto the roof.

Extension panel (12): The purpose of the extension panel (12) is to gain exposed heated surface area on the roof structure if desired. The bottom of the optional extension panel (12) slides onto the top of the eave panel (10) with a lengthwise dovetail interlocking connection (14). The top of the extension panel (12) also incorporates the interlocking connection (14), allowing for the unlimited 'stacking' of panels to achieve any desired heated surface area. Encapsulated within the extension panel (12) are channels (22) that run the length of the panel to accommodate the heat source (25) (27). The underside of the extension panel (12) has a separate channel (23) that is open on one side to allow for a pre-terminated heat cable (26) to be pushed into place. Also running the length of the extension panels (12) is an integrated mounting bracket slot (20) that accepts a slide in bracket (21) to attach panels onto the roof.

Flange (13): The bottom of the flange (13) also incorporates the interlocking dovetail connection (14) allowing for it to be connected to the top of the eave (10) or extension panel (12). The flange (13) shape provides a transition slope between the roof level and the thickness height of the eave (10) or extension panel (12) it is attached to. Encapsulated within the flange (13) is a channel (22) that runs the length of the flange (13) to accommodate the heat source (25) (27). The flange (13) is designed to either mount on top of the roofing material, or with a small amount of the top of the flange (13) underneath a shingle or other roofing material depending on the application.

Valley Panel (11): The valley panel (11) is designed to mount into a roof valley, or where ice may form at roof transitions. Encapsulated within the valley panel (11) are channels (22) that run the length of the panel to accommodate the heat source (25) (27). The underside of the valley panel (11) has a separate channel (23) that is open on one side to allow for a pre-terminated heat cable to be pushed into place. Also running the length of the valley panel (11) is an integrated mounting bracket slot (20) that accepts a slide in bracket (21) to attach panels onto the roof.

The recommended installation of the system suggests a gap (15) between mounted panels to allow for flexing and expansion of the system. Expansion Joint Caps (EJC) are designed to hide the areas where these gaps (15) are present in the system. The ECJ are colored to match the panels. The EJC have two varieties.

Eave Expansion Joint Cap (18): The eave EJC (18) is made from aluminum sheet bent to fit the contours of the eave panel (10) and flange (13) and extension panel (12) if applicable. It should be attached to the mounted panels with sealant/adhesive (29) and hardware (28).

Valley Expansion Joint Cap (19): The valley EJC (19) is made from aluminum sheet bent to fit the contours of the valley panel (11). It should be attached to the mounted valley panels (11) with sealant/adhesive (29).

For attachment to roof, the system uses mounting brackets (21). These brackets (21) are made of sturdy material of a thickness and width that the integrated mounting bracket slots (20) in the panels will accept. The mounting brackets (21) have several holes throughout the bracket to allow mounting hardware (28) to pass through for attaching brackets (21) to the roof.

Thermal Tech System (Refer to FIG. 7):

The Thermal Tech System variation uses a cut to length commercial self-regulating heat cable (25) passed through the encapsulated channels (22) in the panels (10) (11) (12) and flanges (13). The lack of air space between the cable (25) and the hollow (22) in the panel causes the cable (25) to heat the uncovered panel (10) (11) (12) (13) directly. This contact has an effect on the self regulating properties of the heat cable (25), sensing the panel (10) (11) (12) (13) temperature as the ambient temperature. The ends of the cables (25) are terminated at the power source or optional controller, and a waterproof end seal at the end of the cable segment. These cables (25) utilize a 30 MA GFCI breaker, either inline at the connection between the heat cable (25) and the power cord, or in the breaker panel for the involved circuit(s).

Thermal Link System (Refer to FIG. 8):

The Thermal Link System variation uses a pre-terminated "plug together" self regulating heat cable (26). This cable has male and female waterproof receptacles at the cable ends, allowing modular sections of cable/panels to easily plug together during install which eliminates the need for splicing and power terminations. At the beginning of an individual cable section, an A/C male cord end plugs on. At the end of the cable section, a waterproof end seal plugs on. This cable (26) is pushed into a specially formed channel (23) in the panels (10)(11) (12) prior to panel installation. One edge of this channel (23) is slightly raised to retain the cable (23) inside.

Radiant Tech System (Refer to FIG. 9):

The Radiant Tech System variation uses a heated water/anti-freeze liquid solution pumped through hydronic tubing (27) which is inside of the encapsulated channels (24) in the panels (10) (11) (12) and flanges (13). The lack of air space between the tubing and the hollow (24) in the panel causes the heated liquid in the tubing (27) to heat the uncovered panel (10) (11) (12) (13) directly. The material used for this tubing (27) may be anything suitable for a radiant heat application such as polybutylene, polyethylene or composite variants. The Radiant Tech System can be plumbed into an existing radiant flooring or radiant heated driveway system, or can be an independent system with dedicated boilers/heaters, circulators and any control systems desired to be utilized with such equipment.

The examples set out herein illustrate a preferred embodiment of the invention, and such examples are not to be construed as limiting the scope of the invention in any manner.

The invention claimed is:

1. A heated panel for melting snow and ice on a roof, comprising in combination: a flat base panel, at least one linear channel disposed within said base panel, adapted to receive heat generating cables therein; and at least one heat generating cable disposed within said linear channel.

2. A heated panel as set forth in claim 1, wherein said heat generating cable is self-regulating.

3. A heated panel as set forth in claim 2, wherein said heat generating cable is a modular, pre-terminated cable.

4. A heated panel as set forth in claim 1, wherein said flat base panel is constructed of extruded aluminum alloy.

5. A heated panel as set forth in claim 1, including an angled panel extension adapted to extend over the edge of the roof.

* * * * *